M. BEER.
SHEARS HANDLE.
APPLICATION FILED APR. 7, 1913.
1,089,183.
Patented Mar. 3, 1914.
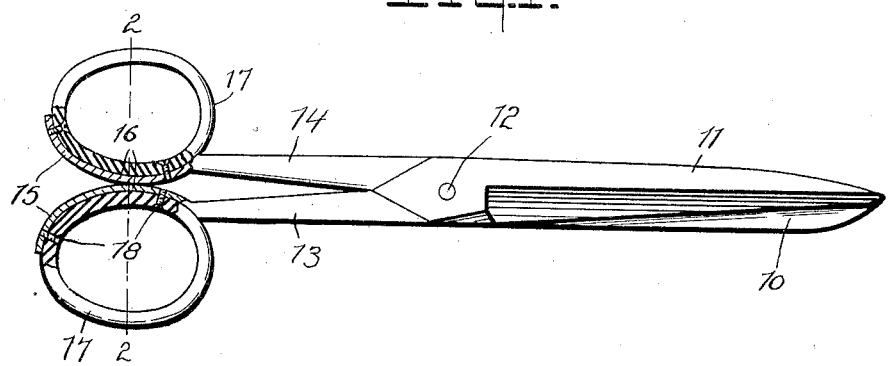
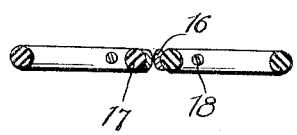
Witnesses
R. N. Jones.
H. Kaye Martin
Inventor
Max Beer.
By Randolph Jr.
Attorney.

UNITED STATES PATENT OFFICE.

MAX BEER, OF RENSSELAER, NEW YORK.

SHEARS-HANDLE.

1,089,183. Specification of Letters Patent. Patented Mar. 3, 1914.

Application filed April 7, 1913. Serial No. 759,498.

*To all whom it may concern:*

Be it known that I, MAX BEER, a citizen of the United States, residing at Rensselaer, in the county of Rensselaer and State of New York, have invented certain new and useful Improvements in Shears-Handles; and I do hereby declare the following to be a full, clear, and exact description of the invention, such as will enable others skilled in the art to which it appertains to make and use the same.

This invention relates to new and useful improvements in shears, and has for its object to provide handles which will form cushioning members for the fingers during the time that the shears are being used.

Another object of my invention is to provide handles which will materially assist the user in opening the jaws when cutting through thick materials, inasmuch as the resiliency of the handles will permit the same to spring upwardly as the operator forces the outer sides of the loops apart.

It will be seen from the above that in using these shears on thick materials the operation of the same will be made more efficient and satisfactory.

With the above and other objects in view I will now proceed to describe my invention in the following specification and accompanying drawings, in which, Figure 1 is a plan view of my improved shears, showing the handles partly in section; and Fig. 2 is a transverse sectional view taken on line 2—2 of Fig. 1.

Referring to the drawings by characters of reference, 10 indicates one of the blades of the shears which coöperates with the blade 11. These blades are preferably of the usual type and sharpened along their coacting edges. A pivot 12 is formed at the inner extremities of the blades by means of which the same are held in operative relation to each other.

The rear ends of the blades are extended, as clearly illustrated at 13 and 14, respectively, and provided at their rearmost extremities with curved portions 15. These curved portions 15 are preferably formed, as shown at 16, to receive the ring 17, which is made of rubber or other suitable resilient material. The rings 17 are held in place by the screws 18, which pass into threaded apertures in the curved portion 15 of the blade extensions. The resilient rings, as described above, are preferably of rubber or other suitable material, and are shaped, as clearly illustrated in Fig. 1, to the usual form of shear handles. These resilient rings are formed to receive the fingers of the operator and form a cushion between the portions 15 and the fingers, whereby injury to the fingers is substantially eliminated.

The operation of my invention is substantially the same as that of the usual shears, with the exception of the fact that the cushioning members are interposed between the extensions 15 and the fingers of the operator, and when it is desired to open the shears the fingers are forced against the outer side of the ring and, as the rubber stretches upwardly, it will cause resilient action and the blades will be correspondingly opened, thereby increasing the efficiency of the device.

While in the foregoing I have shown and described the preferred embodiment of my invention, I wish it to be understood that I may change the specific arrangements of parts without in any way departing from the spirit and scope of my invention.

Having thus fully described my invention what I claim is:

1. A pair of shears comprising two blades pivotally secured at their ends, extensions formed on said blades adjacent their pivoted ends, said extensions projected rearwardly and terminating in curved portions, each of said curved portions being substantially concavo-convex in cross section and lying in direct alinement with each other, elliptical members formed of a yielding material and adapted to conform to the shape of the curved portions on the extensions, said elliptical members being adapted to form cushions for the hands of the operator and also to assist in opening the shears when the device is in use, and means to secure the elliptical members in place.

2. A pair of shears comprising two blades pivotally secured at their ends, extensions formed on each of the blades adjacent their pivoted ends, said extensions projecting rearwardly and terminating in curved portions, bows of elastic material, each of the curved portions being provided with recesses to receive the bows, said bows being adapted to form cushions for the hands of the operator, and means to secure the bows in place.

In testimony whereof I affix my signature in presence of two witnesses.

MAX BEER.

Witnesses:
E. J. GUILFOIL,
H. D. BURHANS.